United States Patent
Futatsugi et al.

(10) Patent No.: US 12,354,292 B2
(45) Date of Patent: Jul. 8, 2025

(54) OBJECT RANGING APPARATUS, METHOD, AND COMPUTER READABLE MEDIUM

(71) Applicant: NEC Corporation, Tokyo (JP)

(72) Inventors: Yasunori Futatsugi, Tokyo (JP); Yoshihiro Mishima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 366 days.

(21) Appl. No.: 17/798,360

(22) PCT Filed: Feb. 9, 2021

(86) PCT No.: PCT/JP2021/004788
§ 371 (c)(1),
(2) Date: Aug. 9, 2022

(87) PCT Pub. No.: WO2021/166742
PCT Pub. Date: Aug. 26, 2021

(65) Prior Publication Data
US 2023/0075659 A1    Mar. 9, 2023

(30) Foreign Application Priority Data
Feb. 19, 2020   (JP) ................. 2020-026569

(51) Int. Cl.
| | | |
|---|---|---|
| G06T 7/55 | (2017.01) | |
| B60W 60/00 | (2020.01) | |
| G01C 3/08 | (2006.01) | |
| G06T 7/521 | (2017.01) | |
| G06T 7/70 | (2017.01) | |
| G06V 20/58 | (2022.01) | |

(52) U.S. Cl.
CPC ............ *G06T 7/55* (2017.01); *G01C 3/085* (2013.01); *G06T 7/521* (2017.01); *G06T 7/70* (2017.01);
(Continued)

(58) Field of Classification Search
CPC .. G06T 7/55; G06T 7/521; G06T 7/70; G06T 2207/10028; G06T 2207/30252;
(Continued)

(56) References Cited

U.S. PATENT DOCUMENTS

2008/0044060 A1    2/2008  Sato et al.
2013/0226378 A1*   8/2013  Tate, Jr. ............... F02D 41/009
                                                  903/930
(Continued)

FOREIGN PATENT DOCUMENTS

JP     2002123818 A  *  4/2002  .......... G01S 13/867
JP     2008-067362 A    3/2008
(Continued)

OTHER PUBLICATIONS

International Search Report for PCT Application No. PCT/JP2021/004788, mailed on May 11, 2021.
(Continued)

*Primary Examiner* — Umair Ahsan

(57) ABSTRACT

An object recognition unit recognizes an object included in an image captured by a camera mounted on a vehicle. A first distance estimation unit estimates a distance between the vehicle and the recognized object based on the image. A second distance estimation unit estimates the distance between the vehicle and the recognized object based on the image by using an estimation method different from that of the first distance estimation unit. A combining unit combines a result of estimating the distance obtained by the first distance estimation unit and a result of estimating the distance obtained by the second distance estimation unit based on at least one of an amount of change in the distance estimated by the second distance estimation unit, a steering wheel angle of the vehicle, and information about an acceleration in an up-down direction, and outputs a result of the combination as a ranging result.

13 Claims, 10 Drawing Sheets

(52) U.S. Cl.
CPC ........... *G06V 20/58* (2022.01); *B60W 60/001* (2020.02); *B60W 2420/403* (2013.01); *B60W 2554/802* (2020.02); *G06T 2207/10028* (2013.01); *G06T 2207/30252* (2013.01)

(58) Field of Classification Search
CPC ..... G01C 3/085; G06V 20/58; B60W 60/001; B60W 2420/403; B60W 2554/802; G01S 17/87; G01S 17/89; G08G 1/166
See application file for complete search history.

(56) References Cited

U.S. PATENT DOCUMENTS

| | | | |
|---|---|---|---|
| 2020/0094848 A1* | 3/2020 | Hu | G07C 5/008 |
| 2020/0133297 A1* | 4/2020 | Ando | B62D 15/0285 |

FOREIGN PATENT DOCUMENTS

| | | | | |
|---|---|---|---|---|
| JP | 2014-142241 A | | 8/2014 | |
| JP | 2015206798 A | * | 11/2015 | ............. G01C 11/06 |
| WO | 2019/021354 A1 | | 1/2019 | |

OTHER PUBLICATIONS

D. Eigen, et al., "Depth Map Prediction from a Single Image using a Multi-Scale Deep Network", 2014 (URL: https://cs.nyu.edu/~deigen/depth/depth_nips14.pdf), pp. 1-9.

* cited by examiner

| RANGING METHOD | OPERATION PRINCIPLE | ESTIMATION ACCURACY | STABILITY |
|---|---|---|---|
| DEPTH ESTIMATION | DEEP LEARNING | LOW ACCURACY | STABLE |
| THREE-DIMENSIONAL POSITION ESTIMATION | MOTION PARALLAX | HIGH ACCURACY | UNSTABLE WHEN ROTATED |

Fig. 3

| OPERATION MODE | THREE-DIMENSIONAL POSITION ESTIMATION | DEPTH ESTIMATION |
|---|---|---|
| OPERATION MODE 1 | OFF | ON |
| OPERATION MODE 2 | ON | OFF |
| OPERATION MODE 3 | OFF | OFF |

Fig. 8

OBJECT RANGING APPARATUS, METHOD, AND COMPUTER READABLE MEDIUM

This application is a National Stage Entry of PCT/JP2021/004788 filed on Feb. 9, 2021, which claims priority from Japanese Patent Application 2020-026569 filed on Feb. 19, 2020, the contents of all of which are incorporated herein by reference, in their entirety.

TECHNICAL FIELD

The present disclosure relates to an object ranging apparatus, method, and computer readable media.

BACKGROUND ART

A technique for estimating a three-dimensional position of an object from an image captured by using a camera mounted on a vehicle such as an automobile is known. For example, Patent Literature 1 discloses a three-dimensional position estimation apparatus for estimating an actual position representing a position in an actual space of feature points present in captured images based on the plurality of captured images captured using a camera mounted on a vehicle.

The three-dimensional position estimation apparatus according to Patent Literature 1 extracts the feature points in the plurality of captured images and associates the feature points among the plurality of captured images. The three-dimensional position estimation apparatus acquires behavior information related to a behavior of the vehicle, and calculates a moving amount of the vehicle based on the behavior information while the plurality of images are being captured. The three-dimensional position estimation apparatus estimates an actual position of the feature points based on the moving amount of the feature points among the plurality of captured images and the moving amount of a moving object.

As another related technique, Non Patent Literature 1 discloses a depth estimation method for estimating a distance between a camera and an object from a single image. Non Patent Literature 1 uses deep learning to estimate a depth on a per-pixel basis.

CITATION LIST

Patent Literature

Patent Literature 1: Japanese Unexamined Patent Application Publication No. 2014-142241

Non Patent Literature

Non Patent Literature 1: D. Eigen, et al., "Depth Map Prediction from a Single Image using a Multi-Scale Deep Network", 2014 (URL: https://cs.nyu.edu/~deigen/depth/depth_nips14.pdf)

SUMMARY OF INVENTION

Technical Problem

By using a method for estimating a three-dimensional position and a method for estimating a depth of the object, the distance to the object can be estimated from a monocular camera image. Results of these estimation methods may be used for autonomous driving control of automobiles. In autonomous vehicle control on vehicles, it is necessary to accurately estimate a distance from a vehicle to another vehicle, person, and another object. However, the present inventors have found that when the three-dimensional position and depth are estimated from image(s) of a camera mounted on a travelling vehicle, the object ranging may not be performed with high accuracy and stability.

In view of the above circumstances, an object of the present disclosure is to provide an object ranging apparatus, method, and program capable of improving accuracy and stability of object ranging when object ranging is performed by using an image of a camera mounted on a vehicle.

Solution to Problem

In order to achieve the above object, the present disclosure provides an object ranging apparatus as a first example aspect. The object ranging apparatus includes: an object recognition unit configured to recognize an object included in a captured image captured by a camera mounted on a vehicle; a first distance estimation unit configured to estimate a distance between the vehicle and the recognized object based on the captured image; a second distance estimation unit configured to estimate the distance between the vehicle and the recognized object based on the captured image by using an estimation method different from that of the first distance estimation unit; and a combining unit configured to combine a result of estimating the distance obtained by the first distance estimation unit and a result of estimating the distance obtained by the second distance estimation unit based on at least one of an amount of change in the distance estimated by the second distance estimation unit, a steering wheel angle of the vehicle, and information about an acceleration in an up-down direction, and outputting a result of the combination as a ranging result.

The present disclosure provides an object ranging method as a second example aspect. An object ranging method includes: recognizing an object included in a captured image captured by a camera mounted on a vehicle; estimating a distance between the vehicle and the recognized object based on the captured image by using a first distance estimation method; estimating the distance between the vehicle and the recognized object based on the captured image by using a second distance estimation method different from the first distance estimation method; and combining a result of estimating the distance obtained by using the first distance estimation method and a result of estimating the distance by using the second distance estimation method based on at least one of an amount of change in the distance estimated by using the second distance estimation method, a steering wheel angle of the vehicle, or information about an acceleration in an up-down direction, and outputting a result of the combination as a ranging result.

The present disclosure provides a computer readable medium as a third example aspect. The computer readable medium stores a program for causing a processor to execute: recognizing an object included in a captured image captured by a camera mounted on a vehicle; estimating a distance between the vehicle and the recognized object based on the captured image by using a first distance estimation method; estimating the distance between the vehicle and the recognized object based on the captured image by using a second distance estimation method different from the first distance estimation method; and combining a result of estimating the distance obtained by using the first distance estimation method and a result of estimating the distance by using the second distance estimation method based on at least one of an amount of change in the distance estimated by using the second distance estimation method, a steering wheel angle of the vehicle, or information about an acceleration in an up-down direction, and outputting a result of the combination as a ranging result.

Advantageous Effects of Invention

An object ranging apparatus, method, and program according to the present disclosure can improve accuracy and stability of object ranging when object ranging is performed by using an image of a camera mounted on a vehicle.

BRIEF DESCRIPTION OF DRAWINGS

FIG. 3 shows characteristics of depth information estimated by a depth estimation unit and distance information estimated by the three-dimensional position estimation unit;

FIG. 8 shows a specific example of an operation mode;

EXAMPLE EMBODIMENT

Figure 1:
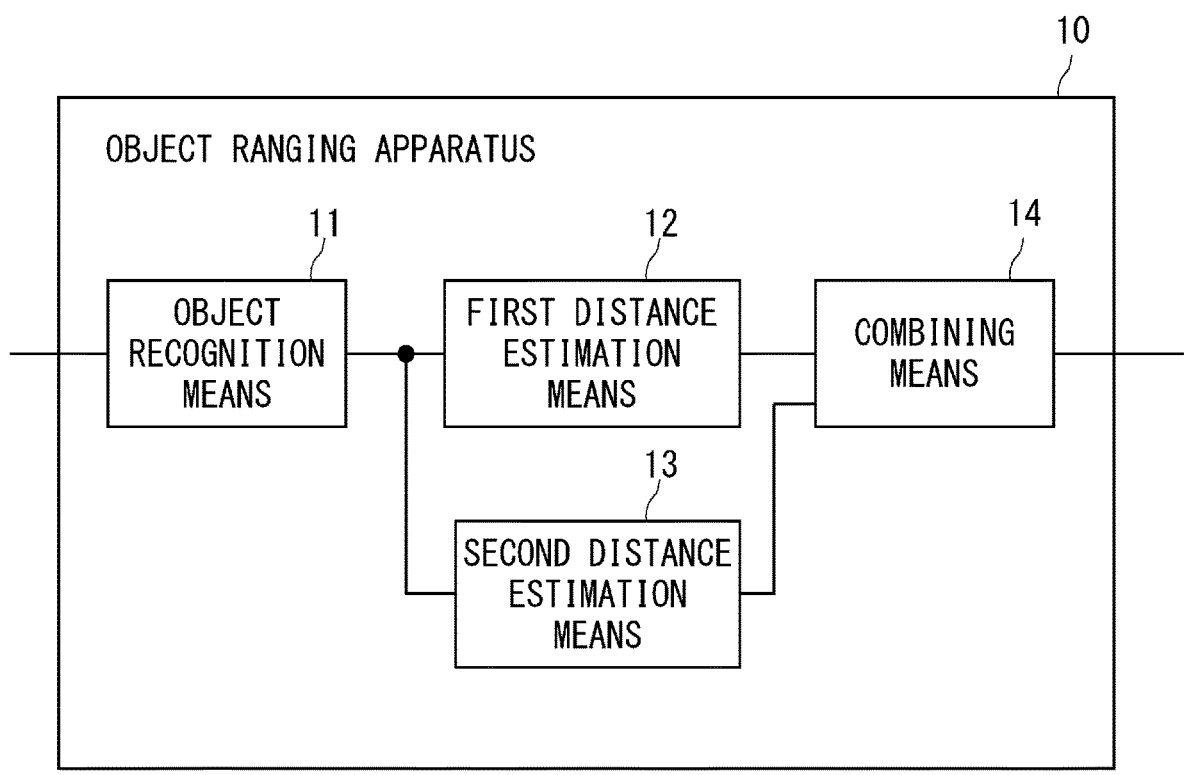
FIG. 1 is a block diagram showing a schematic configuration of an object ranging apparatus according to the present disclosure.

Prior to the description of example embodiments of the present disclosure, an overview of the present disclosure will be described. FIG. 1 shows a schematic configuration of an object ranging apparatus according to the present disclosure. An object ranging apparatus 10 includes object recognition means 11, first distance estimation means 12, second distance estimation means 13, and combining means 14.

The object ranging apparatus 10 receives an image captured by using a camera mounted on a vehicle. The object recognition means 11 recognizes an object included in the captured image. The first distance estimation means 12 estimates a distance between the vehicle and the object recognized by the object recognition means 11 based on the captured image. The second distance estimation means 13 estimates the distance between the vehicle and the object recognized by the object recognition means 11 based on the captured image.

In the present disclosure, the second distance estimation means 13 estimates the distance by using an estimation method different from an estimation method used by the first distance estimation means 12 for estimating the distance. For example, the first distance estimation means 12 may be configured to estimate the distance between the vehicle and the object by means of depth estimation using deep learning. The second distance estimation means 13 may be configured to estimate the distance between the vehicle and the object by using motion parallax between the plurality of captured images.

The combining means 14 combines a result of the estimation obtained by the first distance estimation means 12 and a result of the estimation obtained by the second distance estimation means 13 based on at least one of an amount of change in the distance estimated by the second distance estimation means 13, a steering wheel angle of the vehicle, and acceleration information in an up-down direction. The combining means 14 outputs the combined estimation result as a ranging result. The combining means 14 may combine the result of the estimation obtained by the first distance estimation means with the result of the estimation obtained by the second distance estimation means 13 by weighted addition. Alternatively, the combining means 14 may select either the result of the estimation obtained by the first distance estimation means or the result of the estimation obtained by the second distance estimation means 13 as the ranging result.

In the present disclosure, the object ranging apparatus 10 estimates the distance between the vehicle and the object by using two estimation methods from the image captured by the camera. Since the first distance estimation means 12 and the second distance estimation means 13 estimate the distances using different estimation methods, the accuracy and stability of the distance estimation are considered to be different from each other. For example, although the estimation accuracy of the second distance estimation means 13 may be higher than the estimation accuracy of the first distance estimation means 12, the second distance estimation means 13 may not be able to stably estimate the distance in a situation such as when a movement of the vehicle is large. In the present disclosure, since the object ranging is performed by combining the two results of the estimation, the characteristics of the two distance estimation means can be made to complement each other. Accordingly, the present disclosure can improve the accuracy and stability of object ranging when the object ranging is performed using an image of a camera mounted on a vehicle.

Figure 2:
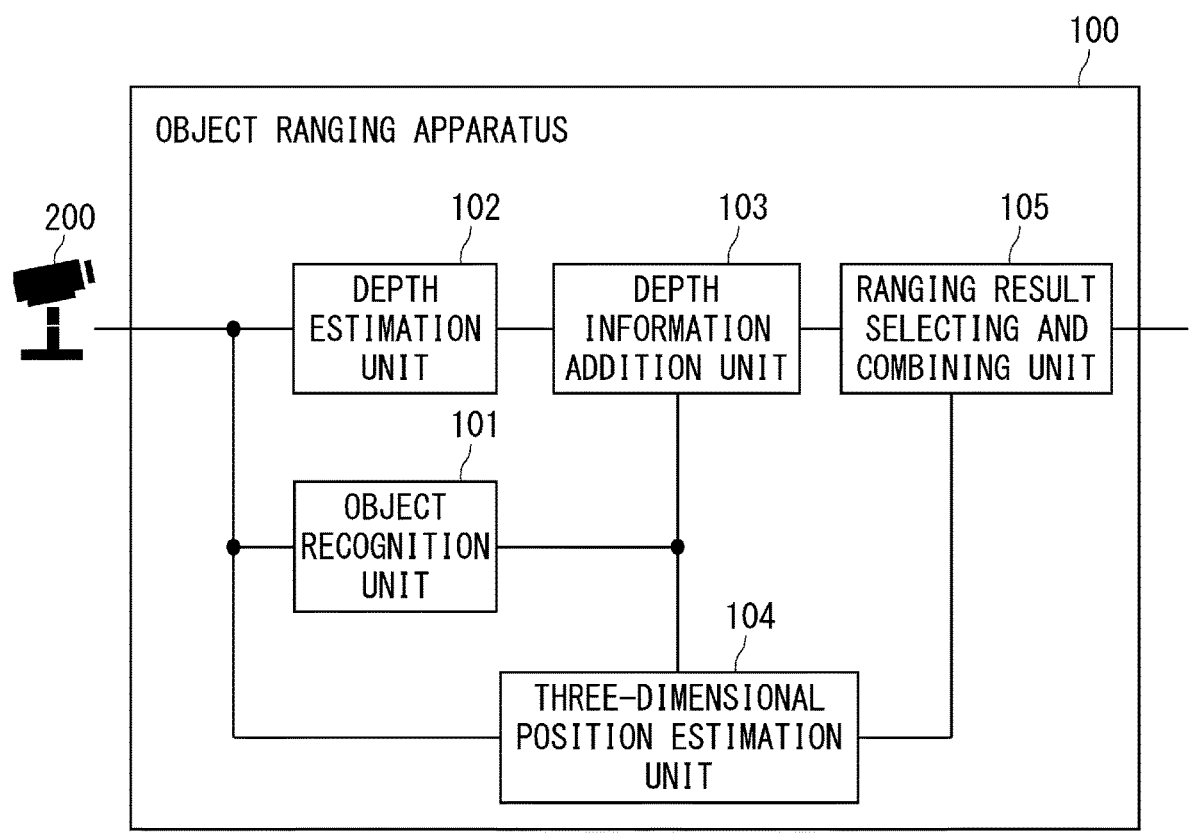
FIG. 2 is a block diagram showing an object ranging apparatus according to a first example embodiment of the present disclosure.

Hereinafter, example embodiments of the present disclosure will be described with reference to the drawings. FIG. 2 shows an object ranging apparatus according to a first example embodiment of the present disclosure. An object ranging apparatus 100 includes an object recognition unit 101, a depth estimation unit 102, a depth information addition unit 103, a three-dimensional position estimation unit 104, and a ranging result selecting and combining unit 105. The object ranging apparatus 100 is mounted on a vehicle such as an automobile. The vehicle has a camera 200. The camera 200 is assumed to be a monocular camera. The camera 200 captures, for example, an area in front of the vehicle (a traveling direction). The object ranging apparatus 100 acquires a captured image from the camera 200 and measures a distance from the vehicle to an object included in the captured image. The object ranging apparatus 100 corresponds to the object ranging apparatus 10 of FIG. 1.

The object recognition unit 101 recognizes the object included in the captured image from the captured image. The object recognition unit 101 recognizes, for example, an object such as another vehicle and a person. The method for object recognition is not particularly limited, and the object recognition unit 101 can recognize an object by using any method. The object recognition unit 101 gives an ID (identifier) for identifying the object to the recognized object. The object recognition unit 101 outputs information such as an object ID, an object type, and coordinates of an object in the image to the depth information addition unit 103 and the three-dimensional position estimation unit 104 for each recognized object. The object recognition unit 101 corresponds to the object recognition means 11 shown in FIG. 1.

The depth estimation unit (depth estimation means) 102 estimates depth information from the image captured by the camera 200. The depth estimation unit 102 estimates a depth representing a distance to the vehicle, for example, for each pixel of the captured image. The depth estimation unit 102 estimates the depth for each pixel by using, for example, the method described in Non Patent Literature 1. The depth estimation unit 102 generates, for example, a distance map obtained by converting the depth of each pixel into a pixel value. The depth estimation unit 102 outputs the generated distance map to the depth information addition unit 103.

The depth information addition unit (depth information addition means) 103 adds the depth information estimated by the depth estimation unit 102 to the object recognized by the object recognition unit 101. The depth information addition unit 103 specifies the depth information of the object based on, for example, the pixel values of the coordinates of the recognized object in the distance map. The depth information addition unit 103 adds the specified depth information to the object ID, object type, and coordinates output by the object recognition unit 101. The depth information addition unit 103 outputs the object ID, object type, coordinates, and depth information to the ranging result selecting and combining unit 105. The depth estimation unit 102 and the depth information addition unit 103 correspond to the first distance estimation means 12 shown in FIG. 1.

The three-dimensional position estimation unit (three-dimensional position estimation means) 104 estimates a three-dimensional position of the object recognized by the object recognition unit 101 from the image captured by the camera 200. The three-dimensional position estimation unit 104 estimates the distance between the vehicle and the object by using, for example, motion parallax between a plurality of the images captured in time series. The three-dimensional position estimation unit 104 may estimate the three-dimensional position (the distance information) by using, for example, the three-dimensional position estimation method described in Patent Literature 1. The three-dimensional position estimation unit 104 outputs the object ID, object type, coordinates, and distance information to the ranging result selecting and combining unit 105. The three-dimensional position estimation unit 104 corresponds to the second distance estimation means 13 shown in FIG. 1.

FIG. 3 shows characteristics of the depth information estimated by the depth estimation unit 102 and the distance information estimated by the three-dimensional position estimation unit 104. An operating principle of the depth estimation used in the depth estimation unit 102 is deep learning. On the other hand, the operation principle of the three-dimensional position estimation used by the three-dimensional position estimation unit 104 is motion parallax. In general, the estimation accuracy of the depth estimation is lower than the estimation accuracy of the three-dimensional position estimation. However, three-dimensional position estimation using the motion parallax as an operating principle has a characteristic of lacking stability when, for example, a vehicle rotates or turns. On the other hand, although the accuracy of the depth estimation is low, the depth can be stably estimated even when the vehicle rotates.

In this example embodiment, the ranging result selecting and combining unit 105 calculates an amount of change in the distance information estimated by the three-dimensional position estimation unit 104. The ranging result selecting and combining unit 105 selects either the depth information input from the depth information addition unit 103 or the distance information input from the three-dimensional position estimation unit 104 based on the estimated amount of change in the distance information, and outputs a result of the selection as a ranging result. Alternatively, the ranging result selecting and combining unit 105 may combine the depth information input from the depth information addition unit 103 and the distance information input from the three-dimensional position estimation unit 104, for example, at a ratio corresponding to the amount of change and output a result of the combination as the ranging result. The ranging result selecting and combining unit 105 corresponds to the combining means 14 shown in FIG. 1.

It is considered that the distance between the vehicle and the object does not change rapidly while the vehicle is traveling. The ranging result selecting and combining unit 105 compares, for example, the amount of change in the distance information estimated by the three-dimensional position estimation unit 104 with a threshold value. The fact that the amount of change is greater than or equal to the threshold value indicates that the three-dimensional position is not correctly estimated in the three-dimensional position estimation. When the amount of change is greater than or equal to the threshold value, the ranging result selecting and combining unit 105 selects the depth information output by the depth information addition unit 103 as the ranging result. When the amount of change is smaller than the threshold value, the ranging result selecting and combining unit 105 selects the distance information output from the three-dimensional position estimation unit 104 as the ranging result. In this manner, the ranging result selecting and combining unit 105 can output the estimated result of the three-dimensional position estimation having high estimation accuracy in a normal state as the ranging result. When there is a possibility that the three-dimensional position estimation unit 104 may not have not correctly estimated the distance, the ranging result selecting and combining unit 105 can output the result of estimating the depth with high stability as the ranging result.

Figure 4:
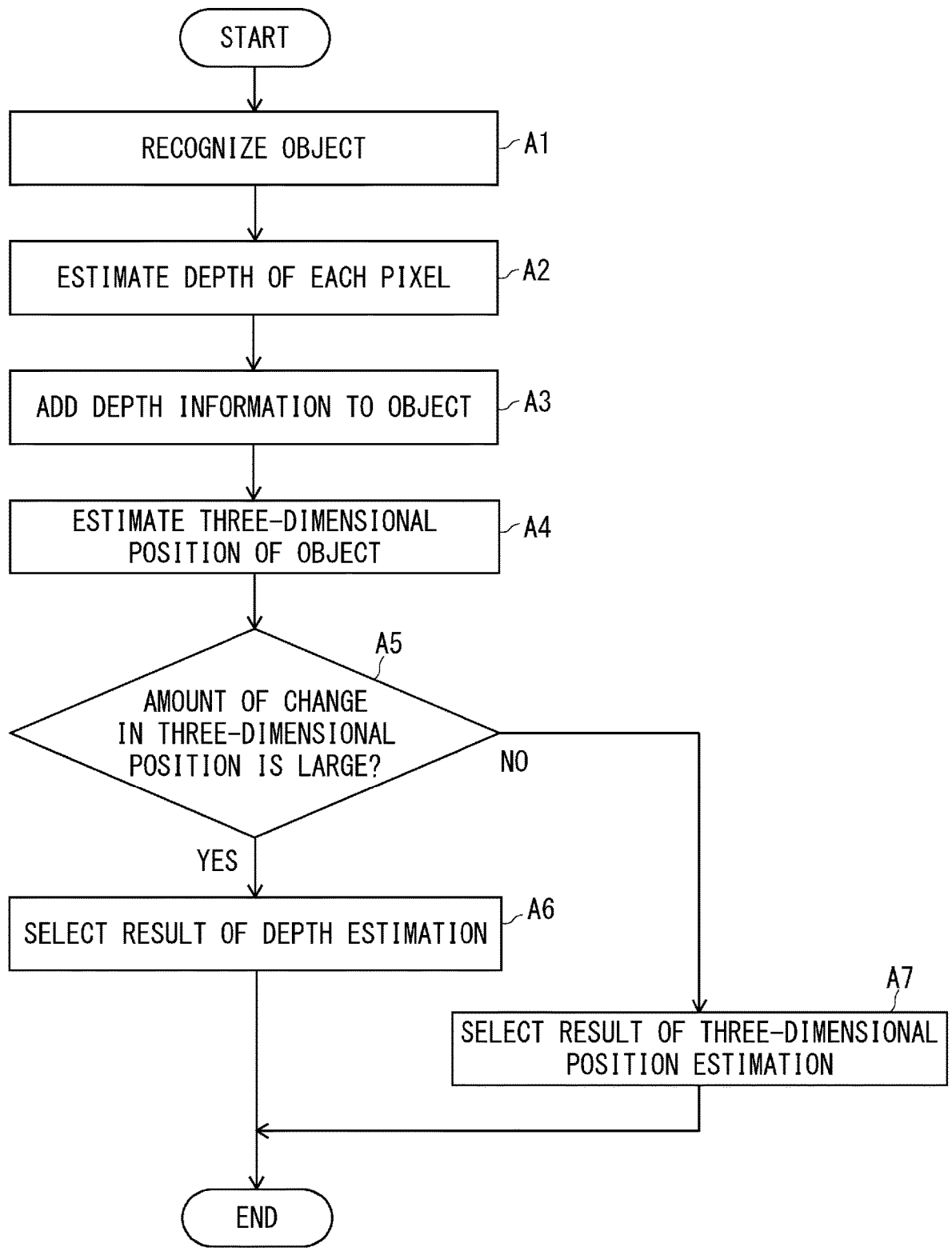
FIG. 4 is a flowchart showing an operation procedure in an object ranging apparatus.

Next, an operation procedure (an object ranging method) will be described. FIG. 4 shows an operation procedure of the object ranging apparatus 100. The camera 200 captures the forward direction of the vehicle. The object recognition unit 101 recognizes an object included in the image captured by the camera 200 (Step A1). The depth estimation unit 102 estimates a depth of each pixel based on the image captured by the camera 200 (Step A2). The depth information addition unit 103 adds depth information to each object recognized by the object recognition unit 101 (Step A3). In Step A3, the depth information addition unit 103 uses, for example, the depth of the coordinates of each object recognized by the object recognition unit 101 as the depth information of each object.

The three-dimensional position estimation unit 104 estimates the three-dimensional position of each object included in the image captured by the camera 200 (Step A4). In Step A4, the three-dimensional position estimation unit 104 estimates a distance between the vehicle and each object.

The ranging result selecting and combining unit 105 calculates the amount of change in the result of estimating the three-dimensional position. The ranging result selecting and combining unit 105 calculates, for example, the amount of change between the latest result of estimating the three-dimensional position and the result of estimating the three-dimensional position one time earlier. The ranging result selecting and combining unit 105 determines whether or not the amount of change is greater than or equal to the threshold value (Step A5). If it is determined that the amount of change is greater than or equal to the threshold value, the ranging result selecting and combining unit 105 selects the result of depth estimation as the ranging result (Step A6). In Step A6, the ranging result selecting and combining unit 105 selects the depth information output by the depth information addition unit 103 as the ranging result. The ranging result selecting and combining unit 105 outputs the object ID, type, coordinates, and depth information to a processing unit (not shown) in a subsequent stage for performing processing using the ranging result.

If it is determined that the amount of change is smaller than the threshold value, the ranging result selecting and combining unit 105 selects the result of the three-dimensional position estimation as the ranging result (Step A7). In Step A7, the ranging result selecting and combining unit 105 selects the distance information output by the three-dimensional position estimation unit 104 as the ranging result. The ranging result selecting and combining unit 105 outputs the object ID, type, coordinates, and distance information to the processing unit in the subsequent stage.

In this example embodiment, the ranging result selecting and combining unit 105 selects the depth information output by the depth information addition unit 103 or the distance information output by the three-dimensional position estimation unit 104 as the ranging result according to the amount of change in the distance estimated by the three-dimensional position estimation unit 104. In this way, even when the accuracy of the result of the three-dimensional position estimation becomes low due to the rotation of the vehicle or the like, the object ranging using a monocular camera can be stably performed with a certain degree of accuracy.

Figure 5:
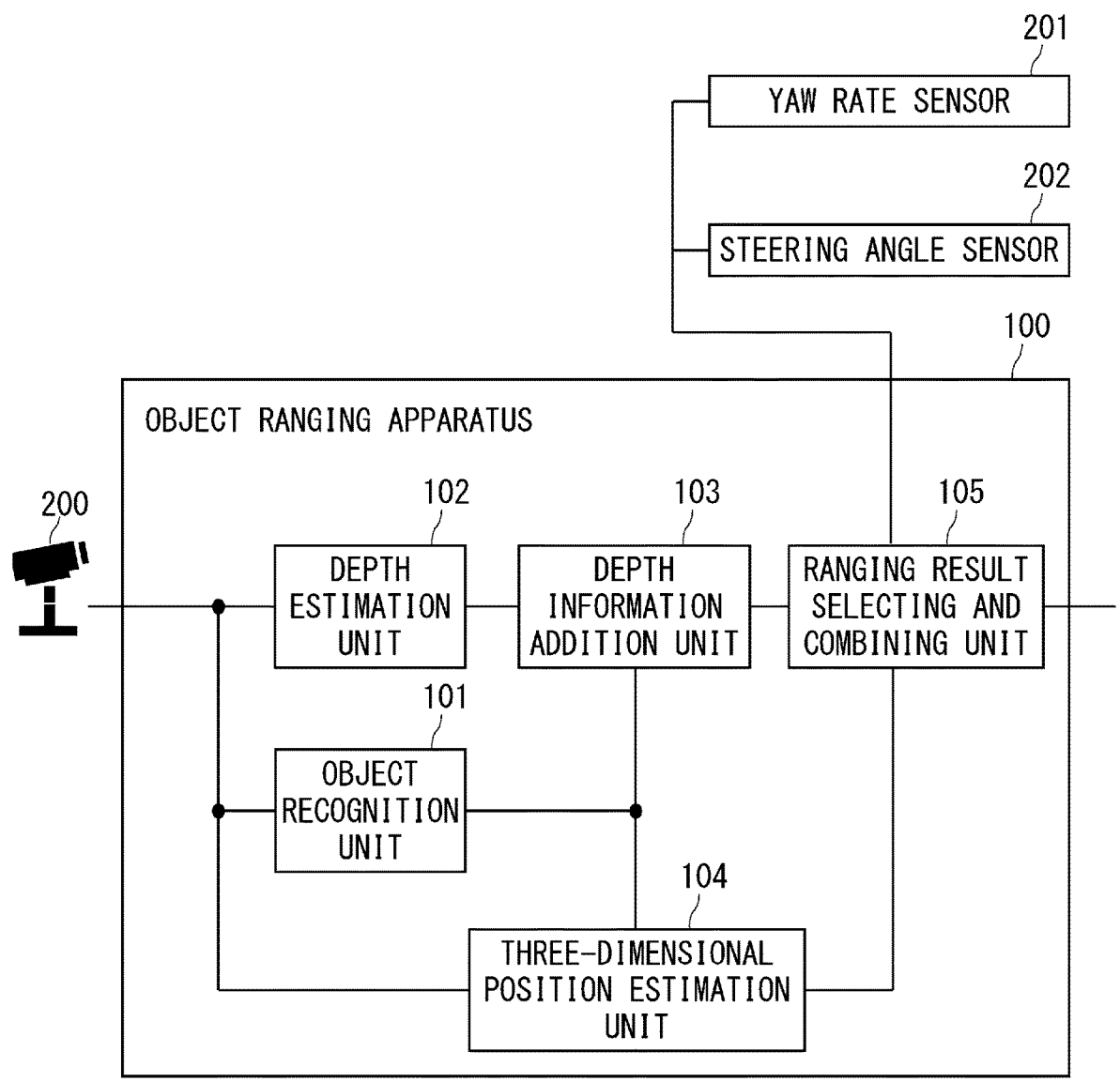
FIG. 5 is a block diagram showing an object ranging apparatus according to a second example embodiment of the present disclosure.

Next, a second example embodiment of the present disclosure will be described. FIG. 5 shows an object ranging apparatus according to the second example embodiment of the present disclosure. A configuration of the object ranging apparatus 100 according to this example embodiment is the same as that of the object ranging apparatus 100 according to the first example embodiment shown in FIG. 2.

In this example embodiment, the object ranging apparatus 100 is connected to vehicle sensors such as a yaw rate sensor 201 and a steering angle sensor 202. The yaw rate sensor 201 detects a yaw rate of a vehicle on which the camera 200 is mounted. The steering angle sensor 202 detects an operation amount of the steering wheel. The object ranging apparatus 100 acquires the yaw rate and the operation amount of the steering wheel from the yaw rate sensor 201 and the steering angle sensor 202 via, for example, a network such as CAN (Controller Area Network).

The operation amount of the steering wheel detected by the steering angle sensor 202 corresponds to a steering wheel angle. The yaw rate detected by the yaw rate sensor 201 varies according to the steering wheel angle. In this example embodiment, the ranging result selecting and combining unit 105 obtains the steering wheel angle based on at least one of the yaw rate detected by the yaw rate sensor 201 and the operation amount of the steering wheel detected by the steering angle sensor 202. The ranging result selecting and combining unit 105 weights and adds the depth information output by the depth information addition unit 103 and the distance information output by the three-dimensional position estimation unit 104 according to the steering wheel angle. The ranging result selecting and combining unit 105 outputs the result of the weighted addition as the ranging result.

The ranging result selecting and combining unit 105 determines the weight (a combining weight) of the weighted addition according to, for example, the steering wheel angle. For example, the ranging result selecting and combining unit 105 increases the weight of the distance information output by the three-dimensional position estimation unit 104 as the steering wheel angle becomes smaller, that is, as a traveling direction of the vehicle becomes closer to a straight traveling direction. The ranging result selecting and combining unit 105 increases the weight of the depth information output by the depth information addition unit 103 as the steering wheel angle increases.

When the coordinates of the object are defined as, for example, (x, y), the ranging result selecting and combining unit 105 calculates a ranging result Z (x, y) of an object by the following equation.

$$Z(x,y) = \alpha \times Z_{depth}(x,y) + (1-\alpha) \times Z_{3dloc}(x,y)$$

In the above equation, $Z_{depth}(x,y)$ represents the depth information output by the depth information addition unit 103, and $Z_{3dloc}(x,y)$ represents the distance information output by the three-dimensional position estimation unit 104. Further, α represents the weight of the depth information, and $0 \le \alpha \le 1$ holds. The ranging result selecting and combining unit 105 sets a value of α to a value close to 0 when the steering wheel angle is small, and sets the value of α to a value close to 1 when the steering wheel angle is large.

In this example embodiment, the ranging result selecting and combining unit 105 weights and adds the result of estimating the depth and the result of estimating the three-dimensional position by weights according to the steering wheel angle. In this example embodiment, the ranging result selecting and combining unit 105 increases the combining weight of the estimated result of the three-dimensional position when the steering wheel angle is small and therefore the accuracy of the estimated result of the three-dimensional position estimation is expected to be high. On the other hand, the ranging result selecting and combining unit 105 reduces the combining weight of the estimated result of the three-dimensional position when the steering wheel angle is large and therefore the accuracy of the estimated result of the three-dimensional position is expected to deteriorate. In this manner, as in the first example embodiment, the object ranging by using a monocular camera can be stably performed with a certain degree of accuracy.

Figure 6:
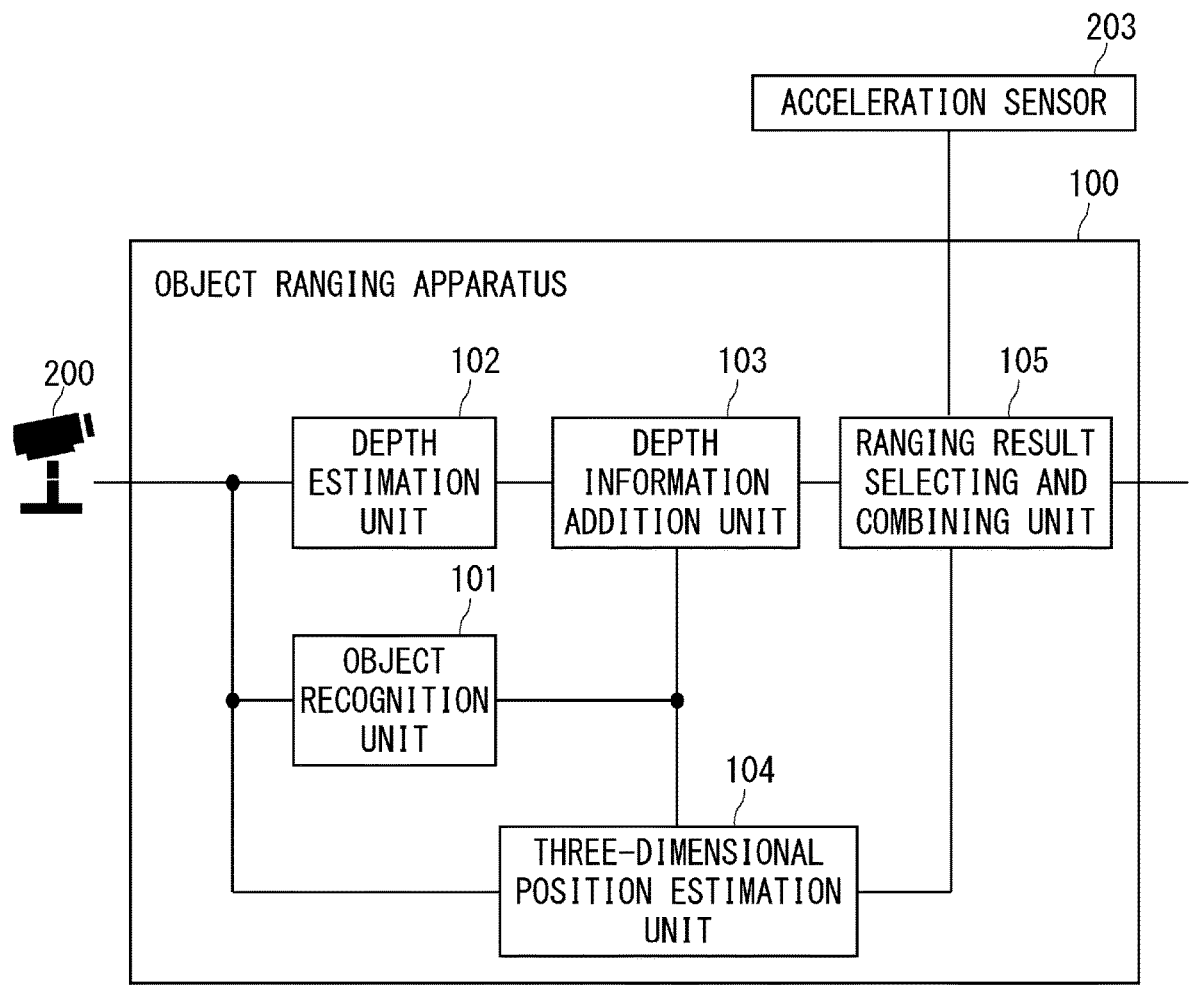
FIG. 6 is a block diagram showing an object ranging apparatus according to a third example embodiment of the present disclosure.

Next, a third example embodiment of the present disclosure will be described. FIG. 6 shows an object ranging apparatus according to the third example embodiment of the present disclosure. A configuration of the object ranging apparatus 100 according to this example embodiment is the same as that of the object ranging apparatus 100 according to the first example embodiment shown in FIG. 2. In this example embodiment, the ranging result selecting and combining unit 105 weights and adds the depth information output by the depth information addition unit 103 and the distance information output by the three-dimensional position estimation unit 104.

In this example embodiment, the object ranging apparatus 100 is connected to an acceleration sensor 203. The acceleration sensor 203 detects an acceleration of a vehicle on which the camera 200 is mounted. The acceleration sensor 203 detects the acceleration, especially in the up-down direction, of the vehicle. The ranging result selecting and combining unit 105 acquires acceleration information from the acceleration sensor 203 via a network such as CAN. The ranging result selecting and combining unit 105 determines the weight in the weighted addition based on the acquired acceleration information. For example, when the acceleration in the up-down direction is small, the ranging result selecting and combining unit 105 increases the weight of the distance information output by the three-dimensional position estimation unit 104. When the acceleration in the up-down direction is large, the ranging result selecting and combining unit 105 increases the weight of the depth information output by the depth information addition unit 103.

For example, when the vehicle on which the camera 200 is mounted passes through a stepped part while traveling, a large acceleration in the up-down direction is detected. When the vehicle passes through the step, the position of the object greatly fluctuates in the up-down direction in the image captured by the camera 200. In this case, the accuracy of the result of estimating the three-dimensional position decreases. On the other hand, it is considered that the estimated result of the depth does not significantly deteriorate even when the vehicle passes a step.

In this example embodiment, when the acceleration in the up-down direction is large, the ranging result selecting and combining unit 105 increases the combining weight of the result of estimating the depth. When the acceleration in the up-down direction is small, the ranging result selecting and combining unit 105 increases the combined weight of the result of estimating the three-dimensional position. By doing so, even when the vehicle passes a step, the object ranging by using a monocular camera can be stably performed with a certain degree of accuracy.

This example embodiment can be combined with the second example embodiment. In this case, the ranging result selecting and combining unit 105 may change the weight set according to the steering wheel angle in accordance with the acceleration in the up-down direction.

Figure 7:
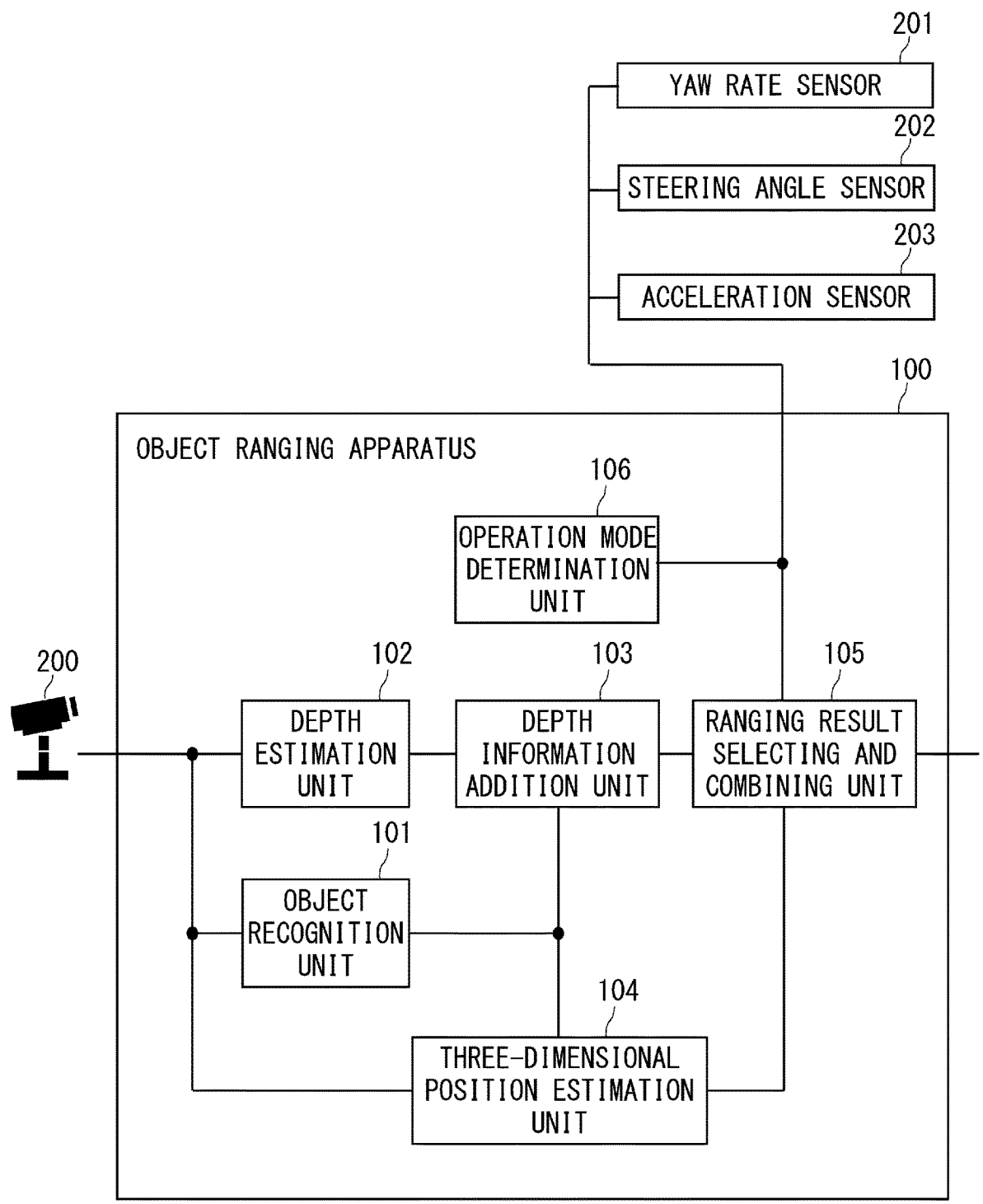
FIG. 7 is a block diagram showing an object ranging apparatus according to a fourth example embodiment of the present disclosure.

Next, a fourth example embodiment of the present disclosure will be described. FIG. 7 shows an object ranging apparatus according to the fourth example embodiment of the present disclosure. An object ranging apparatus 100a includes an operation mode determination unit 106 in addition to the configuration of the object ranging apparatus 100 according to the second and third example embodiments shown in FIGS. 5 and 6.

The operation mode determination unit (operation mode determination means) 106 determines the operation mode of the object ranging apparatus 100a. The operation mode determination unit 106 determines an operation mode based on information acquired from, for example, at least one of the yaw rate sensor 201, the steering angle sensor 202, and the acceleration sensor 203. The operation mode determination unit 106 determines the operation mode based on the result of the object recognition by the object recognition unit 101. The operation mode determination unit 106 stops the operation of at least one of the depth estimation unit 102 and the three-dimensional position estimation unit 104 according to the operation mode.

FIG. 8 shows a specific example of the operation modes. When the steering wheel angle determined from at least one of the yaw rate sensor 201 and the steering angle sensor 202 is greater than or equal to a threshold value (a first threshold value), the operation mode determination unit 106 determines the operation mode as an operation mode 1. Alternatively or additionally, if the acceleration in the up-down direction detected by the acceleration sensor 203 is greater than or equal to a threshold value, the operation mode determination unit 106 determines the operation mode as the operation mode 1. In the operation mode 1, the ranging result selecting and combining unit 105 sets the weight of the result of estimating the three-dimensional position to 0 in the weighted addition. In the operation mode 1, the operation mode determination unit 106 stops the operation of the three-dimensional position estimation unit 104 and operates the depth estimation unit 102.

When the steering wheel angle is smaller than a threshold (a second threshold value), the operation mode determination unit 106 determines the operation mode as an operation mode 2. Alternatively or additionally, when the acceleration in the up-down direction detected by the acceleration sensor 203 is smaller than the threshold value, the operation mode determination unit 106 determines the operation mode as the operation mode 2. In the operation mode 2, the ranging result selecting and combining unit 105 sets the weight of the result of estimating the depth to 0 in the weighted addition. In the operation mode 2, the operation mode determination unit 106 stops the operation of the depth estimation unit 102 and operates the three-dimensional position estimation unit 104.

The first threshold value and the second threshold value may be the same value. When the first threshold value and the second threshold value are the same, the ranging result selecting and combining unit 105 selects the result of estimating the three-dimensional position or the result of estimating the depth measurement according to whether or not the steering wheel angle or acceleration is greater than or equal to the threshold values, respectively. When the first threshold value and the second threshold value are different from each other (the first threshold value>the second threshold value), the ranging result selecting and combining unit 105 may set the aforementioned a to a value corresponding to at least one of the steering wheel angle and the acceleration in the aforementioned direction, and weight and add the results of estimating the three-dimensional position and the depth measurement.

When the object recognition unit 101 does not recognize an object, that is, when no object is included in the captured image, the operation mode determination unit 106 determines the operation mode as an operation mode 3. In the operation mode 3, since the object to be ranged is not present in the image, it is not necessary to perform depth estimation and three-dimensional position estimation. In the operation mode 3, the operation mode determination unit 106 stops both the depth estimation unit 102 and the three-dimensional position estimation unit 104.

In this example embodiment, the operation mode determination unit 106 stops the operation of the three-dimensional position estimation unit 104 when the ranging result selecting and combining unit 105 does not use the result of estimating the three-dimensional position for the ranging result. In addition, the operation mode determination unit 106 stops the operation of the depth estimation unit 102 when the ranging result selecting and combining unit 105 does not use the result of estimating the depth for the ranging result. Further, the operation mode determination unit 106 stops the operations of the depth estimation unit 102 and the three-dimensional position estimation unit 104 when the object to be ranged is not present in the captured image. In this way, an amount of calculation required to obtain the ranging result can be reduced, thereby reducing the power consumption of the object ranging apparatus 100.

Figure 9:
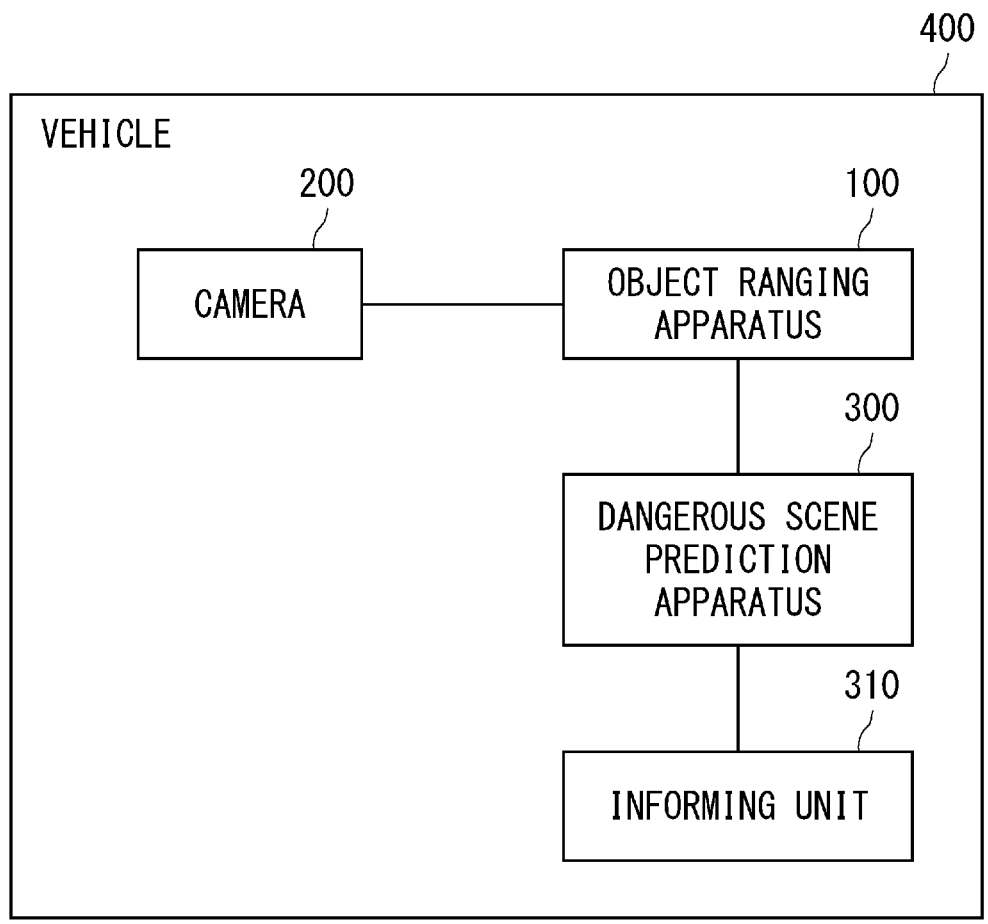
FIG. 9 is a block diagram showing a vehicle on which the object ranging apparatus and a camera are mounted.

Next, an example in which the object ranging apparatus 100 is applied to the recognition of a dangerous scene will be described. FIG. 9 shows a vehicle on which the object ranging apparatus 100 and the camera 200 are mounted. A vehicle 400 includes a dangerous scene prediction apparatus 300 and an informing unit 310 in addition to the object ranging apparatus 100 and the camera 200.

The dangerous scene prediction apparatus 300 acquires object ID, type, coordinates, and distance information for each object from the object ranging apparatus 100. Based on the distance between the vehicle and each object, the dangerous scene prediction apparatus 300 predicts a possible dangerous event that could occur in the future which is not yet visible from the surrounding situation. The dangerous scene prediction apparatus 300 obtains, from the object ranging apparatus 100, a distance between, for example, another vehicle present around the vehicle 400 and the vehicle 400, and calculates a probability of a collision between the vehicle 400 and the surrounding vehicle. Alternatively, the dangerous scene prediction apparatus 300 obtains the distance between the vehicle 400 and an obstacle or a person in the traveling direction and the object ranging apparatus 100, and calculates a probability of a collision between the vehicle 400 and the obstacle or the person. The dangerous scene prediction apparatus 300 determines that a dangerous scene is predicted when the calculated probability is greater than or equal to a threshold value.

When the dangerous scene prediction apparatus 300 predicts a dangerous scene, the informing unit 310 informs a driver of the vehicle 400 of the danger. The informing unit 310 displays, for example, a sign for warning of the danger or generates a sound for warning of the danger to alert the driver. In the present disclosure, since the object ranging can be stably performed with a certain degree of accuracy, the warning can be accurately and stably performed.

Figure 10:
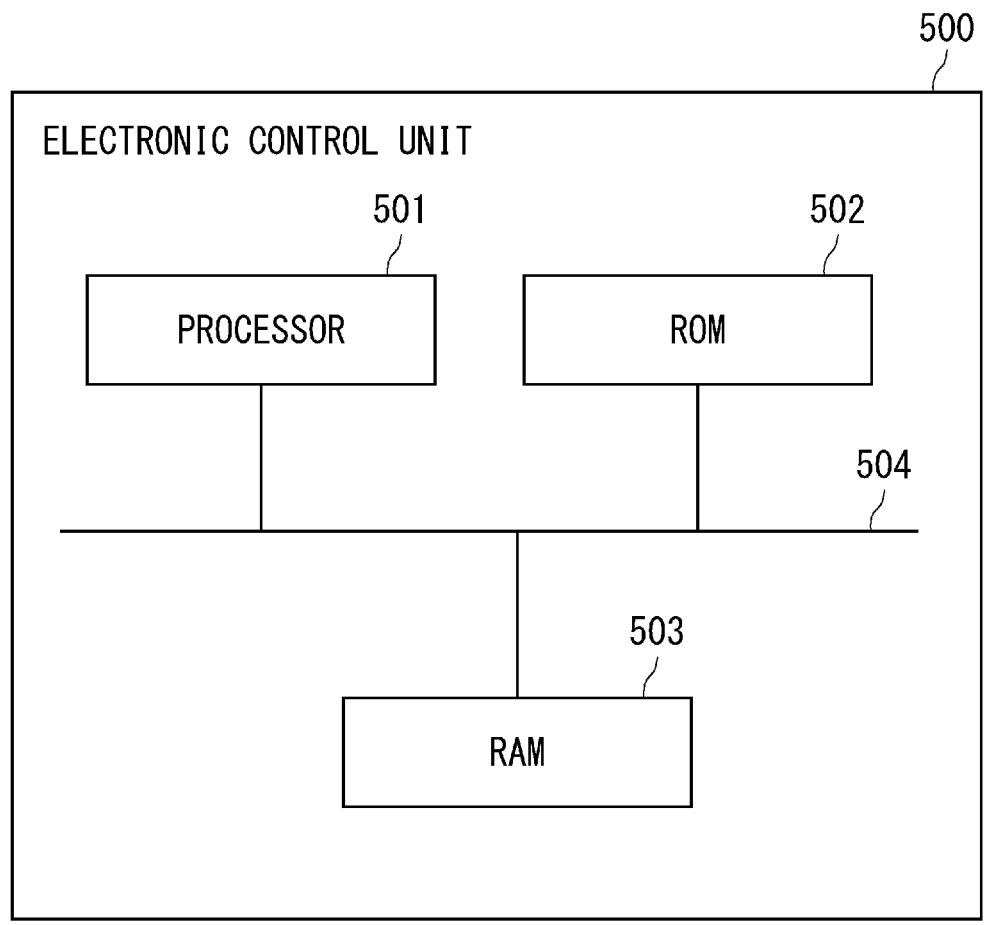
FIG. 10 is a block diagram showing a hardware configuration of an electronic control apparatus that may be used in the object ranging apparatus.

In the present disclosure, the object ranging apparatus 100 and the dangerous scene prediction apparatus 300 may be configured as electronic control units. FIG. 10 shows a hardware configuration of an electronic control apparatus that can be used for the object ranging apparatus 100 or the like. An electronic control unit 500 includes a processor 501, a ROM (read only memory) 502, and a RAM (random access memory) 503. In the electronic control unit 500, the processor 501, the ROM (read only memory) 502, and the RAM (random access memory) 503 are connected to each other via a bus 504. The electronic control unit 500 may include other circuitry, such as peripheral circuitry, communication circuitry, and interface circuitry, which are not shown.

The ROM 502 is a non-volatile storage device. The ROM 502 is a semiconductor memory device such as a flash memory having a relatively small capacity. The ROM 502 stores a program executed by the processor 501.

The above program can be stored and provided to the electronic control unit 500 using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), optical disk medium such as CD (compact disc) and DVD (digital versatile disk), and semiconductor memories (such as mask ROM, PROM (programmable ROM), EPROM (erasable PROM), flash ROM, RAM, etc.). The program may be provided to the electronic control unit using any type of transitory computer readable media. Examples of transitory computer readable media include electric signals, optical signals, and electromagnetic waves. Transitory computer readable media can provide the program to electronic control unit via a wired communication line (e.g. electric wires, and optical fibers) or a wireless communication line.

The RAM 503 is a volatile storage device. Various semiconductor memory devices such as a DRAM (Dynamic Random Access Memory) or an SRAM (Static Random Access Memory) are used as the RAM 503. The RAM 540 may be used as an internal buffer for temporarily storing data and the like.

The processor 501 expands the program stored in the ROM 502 into the RAM 503 and executes it. The functions of each unit of the object ranging apparatus 100 can be implemented by the CPU 501 executing the program.

Although the example embodiments of the present disclosure have been described above in detail, the present disclosure is not limited to the above-described example embodiments, and changes or modifications to the above-described example embodiments are also included in the present disclosure to the extent that they do not depart from the spirit of the present disclosure.

The whole or part of the example embodiments disclosed above can be described as, but not limited to, the following supplementary notes.

Supplementary Note 1

An object ranging apparatus comprising:
  an object recognition unit configured to recognize an object included in a captured image captured by a camera mounted on a vehicle;
  a first distance estimation unit configured to estimate a distance between the vehicle and the recognized object based on the captured image;
  a second distance estimation unit configured to estimate the distance between the vehicle and the recognized object based on the captured image by using an estimation method different from that of the first distance estimation unit; and
  a combining unit configured to combine a result of estimating the distance obtained by the first distance estimation unit and a result of estimating the distance obtained by the second distance estimation unit based on at least one of an amount of change in the distance estimated by the second distance estimation unit, a steering wheel angle of the vehicle, or information about an acceleration in an up-down direction, and outputting a result of the combination as a ranging result.

Supplementary Note 2

The object ranging apparatus according to Supplementary note 1, wherein
  the first distance estimation unit is configured to estimate the distance between the vehicle and the object by estimating a depth of each part in the captured image by using a result learned by using deep learning, and
  the second distance estimation unit is configured to estimate the distance between the vehicle and the object based on motion parallax in a plurality of the captured images.

Supplementary Note 3

The object ranging apparatus according to claim 2, wherein
the first distance estimation unit includes a depth estimation unit configured to estimate a depth and a depth information addition unit configured to add information about the depth to information about the object recognized by the object recognition unit.

Supplementary Note 4

The object ranging apparatus according to any one of Supplementary notes 1 to 3, wherein
the object recognition is configured to output identification information, a type, and coordinates of the recognized object to each of the first distance estimation unit and the second distance estimation unit.

Supplementary Note 5

The object ranging apparatus according to Supplementary note 4, wherein
the first distance estimation unit is configured to output, for each object, the identification information, the type, and the coordinates of the object, and the distance between the vehicle and the object to the combining unit, and
the second distance estimation unit is configured to output, for each object, the identification information, the type, and the coordinates of the object, and the distance between the vehicle and the object to the combining unit.

Supplementary Note 6

The object ranging apparatus according to any one of Supplementary notes 1 to 5, wherein
the combining unit is configured to compare the amount of change in the distance estimated by the second distance estimation unit with a threshold value, select a result of estimating the distance of the first distance estimation unit when the amount of change is greater than or equal to the threshold value, and select the result of estimating the distance obtained by the second distance estimation unit when the amount of change is smaller than the threshold value.

Supplementary Note 7

The object ranging apparatus according to any one of Supplementary notes 1 to 5, wherein
the combining unit is configured to weight and add the result of estimating the distance obtained by the first distance estimation unit and the result of estimating the distance obtained by the second distance estimation unit with a weight corresponding to the steering wheel angle, thereby combining the result of estimating the distance obtained by the first distance estimation unit with the result of estimating the distance obtained by the second distance estimation unit.

Supplementary Note 8

The object ranging apparatus according to Supplementary note 7, wherein
the combining unit is configured to obtain the steering wheel angle based on at least one of sensor information output from a steering angle sensor configured to detect an amount of an operation of a steering wheel in the vehicle or sensor information output from a yaw rate sensor configured to detect a yaw rate of the vehicle.

Supplementary Note 9

The object ranging apparatus according to Supplementary note 7 or 8, wherein
the combining unit is configured to change the weight according to information about a magnitude of the acceleration in the up-down direction.

Supplementary Note 10

The object ranging apparatus according to any one of Supplementary notes 1 to 5, wherein
the combining unit is configured to weight and add the result of estimating the distance obtained by the first distance estimation unit and the result of estimating the distance obtained by the second distance estimation unit with a weight corresponding to information about a magnitude of the acceleration in the up-down direction, thereby combining the result of estimating the distance obtained by the first distance estimation unit with the result of estimating the distance obtained by the second distance estimation unit.

Supplementary Note 11

The object ranging apparatus according to any one of Supplementary notes 1 to 5, further comprising:
an operation mode determination unit configured to determine an operation mode based on at least one of the steering wheel angle or the acceleration information in the up-down direction, wherein
when at least one of the steering wheel angle or the information about the magnitude of the acceleration in the up-down direction is greater than or equal to a first threshold value, the operation mode determination unit is configured to determine that the operation mode is a first operation mode,
in the first operation mode, the combining unit is configured to select the result of estimating the distance obtained by the first distance estimation unit, and
in the first operation mode, the operation mode determination unit is configured to stop the operation of the second distance estimation unit.

Supplementary Note 12

The object ranging apparatus according to Supplementary note 11, wherein
when at least one of the steering wheel angle or the information about the magnitude of the acceleration in the up-down direction is smaller than a second threshold value, the operation mode determination unit is configured to determine that the operation mode is a second operation mode, in the second operation mode, the combining unit is configured to select the result of estimating the distance obtained by the second distance estimation unit, and in the second operation mode, the operation mode determination unit is configured to stop the operation of the first distance estimation unit.

Supplementary Note 13

The object ranging apparatus according to Supplementary note 11 or 12, wherein when the object recognition unit determines that the captured image does not include an object, the operation mode determination unit is configured to determine that the operation mode is a third operation mode, and stop both the first distance estimation unit and the second distance estimation unit.

Supplementary Note 14

An object ranging method comprising:
recognizing an object included in a captured image captured by a camera mounted on a vehicle;
estimating a distance between the vehicle and the recognized object based on the captured image by using a first distance estimation method;
estimating the distance between the vehicle and the recognized object based on the captured image by using a second distance estimation method different from the first distance estimation method; and
combining a result of estimating the distance obtained by using the first distance estimation method and a result of estimating the distance by using the second distance estimation method based on at least one of an amount of change in the distance estimated by using the second distance estimation method, a steering wheel angle of the vehicle, or information about an acceleration in an up-down direction, and outputting a result of the combination as a ranging result.

Supplementary Note 15

The object ranging method according to Supplementary note 14, wherein in the first distance estimation method, the distance between the vehicle and the object is estimated by estimating a depth of each part in the captured image by using a result learned by using deep learning, and in the second distance estimation method, the distance between the vehicle and the object is estimated based on motion parallax in a plurality of the captured images.

Supplementary Note 16

A program for causing a processor to execute:
recognizing an object included in a captured image captured by a camera mounted on a vehicle;
estimating a distance between the vehicle and the recognized object based on the captured image by using a first distance estimation method;
estimating the distance between the vehicle and the recognized object based on the captured image by using a second distance estimation method different from the first distance estimation method; and
combining a result of estimating the distance obtained by using the first distance estimation method and a result of estimating the distance by using the second distance estimation method based on at least one of an amount of change in the distance estimated by using the second distance estimation method, a steering wheel angle of the vehicle, or information about an acceleration in an up-down direction, and outputting a result of the combination as a ranging result.

This application claims priority on the basis of Japanese Patent Application No. 2020-026569, filed Feb. 19, 2020, the entire disclosure of which is incorporated herein by reference.

REFERENCE SIGNS LIST

10 OBJECT RANGING APPARATUS
11 OBJECT RECOGNITION MEANS
12 FIRST DISTANCE ESTIMATION MEANS
13 SECOND DISTANCE ESTIMATION MEANS
14 COMBINING MEANS
100 OBJECT RANGING APPARATUS
101 OBJECT RECOGNITION UNIT
102 DEPTH ESTIMATION UNIT
103 DEPTH INFORMATION ADDITION UNIT
104 THREE-DIMENSIONAL POSITION ESTIMATION UNIT
105 RANGING RESULT SELECTING AND COMBINING UNIT
106 OPERATION MODE DETERMINATION UNIT
200 CAMERA
201 YAW RATE SENSOR
202 STEERING ANGLE SENSOR
203 ACCELERATION SENSOR
300 DANGEROUS SCENE PREDICTION APPARATUS
310 INFORMING UNIT
400 VEHICLE

What is claimed is:
1. An object ranging apparatus comprising:
at least one memory storing instructions; and
at least one processor configured to execute the instructions to:
recognize an object included in a captured image captured by a camera mounted on a vehicle;
estimate a first distance between the vehicle and the recognized object based on the captured image by using a first distance estimation method in which the first distance is estimated by estimating a depth of each part in the captured image by using a result learned by using deep learning;
estimate a second distance between the vehicle and the recognized object based on the captured image by using an estimation method in which the second distance is estimated based on motion parallax in a plurality of the captured images; and
the first distance the second distance by weighting and adding the first distance and the second distance with a weight corresponding to a steering wheel angle; and
output a result of the combination as a ranging result.

2. The object ranging apparatus according to claim 1, wherein the at least one processor is configured to execute the instructions to add information about the estimated depth to information about the recognized object.

3. The object ranging apparatus according to claim 1, wherein the at least one processor is configured to execute the instructions to
generate identification information, a type, and coordinates of the recognized object.

4. The object ranging apparatus according to claim 3, wherein the at least one processor is configured to execute the instructions to combine, for each object, the first distance and the second distance, and output, for each object, the result of the combination, the identification information, the type, and the coordinates of the object.

5. The object ranging apparatus according to claim 1, wherein the at least one processor is configured to execute the instructions to compare an amount of change in the second distance with a threshold value, select the first distance when the amount of change is greater than or equal to the threshold value, and select the second distance when the amount of change is smaller than the threshold value.

6. The object ranging apparatus according to claim 1, wherein the at least one processor is configured to execute the instructions to obtain the steering wheel angle based on at least one of sensor information output from a steering angle sensor configured to detect an amount of an operation of a steering wheel in the vehicle or sensor information output from a yaw rate sensor configured to detect a yaw rate of the vehicle.

7. The object ranging apparatus according to claim 1, wherein the at least one processor is configured to execute the instructions to change the weight according to information about a magnitude of a acceleration in the up-down direction.

8. The object ranging apparatus according to claim 1, wherein the at least one processor is configured to execute the instructions to weight and add the first distance the second distance with a weight corresponding to information about a magnitude of an acceleration in the up-down direction, to combine the first distance with the second distance.

9. The object ranging apparatus according to claim 1, wherein the at least one processor is configured to execute the instructions to:

determine an operation mode based on the steering wheel angle and an acceleration information in the up-down direction;

determine, when the steering wheel angle and the information about the magnitude of the acceleration in the up-down direction is greater than or equal to a first threshold value, that the operation mode is a first operation mode, select, in the first operation mode, the first distance as the ranging result, and not estimate, in the first operation mode, the second distance.

10. The object ranging apparatus according to claim 9, wherein the at least one processor is configured to execute the instructions to:

determine, when the steering wheel angle and the information about the magnitude of the acceleration in the up-down direction is smaller than a second threshold value, that the operation mode is a second operation mode; and select, in the second operation mode, the second distance as the ranging result; and not estimate, in the second operation mode, the first distance.

11. The object ranging apparatus according to claim 9, wherein the at least one processor is configured to execute the instructions to:

determine, when it is determined that the captured image does not include an object, that the operation mode is a third operation mode; and not estimate the first distance and the second distance in the third operation mode.

12. An object ranging method performed by a computer and comprising:

recognizing an object included in a captured image captured by a camera mounted on a vehicle;

estimating a first distance between the vehicle and the recognized object based on the captured image by using a first distance estimation method in which the first distance is estimated by estimating a depth of each part in the captured image by using a result learned by using deep learning;

estimating a second distance between the vehicle and the recognized object based on the captured image by using a second distance estimation in which the second distance is estimated based on motion parallax in a plurality of the captured images; and combining the first distance and the second distance by weighting and adding the first distance and the second distance with a weight corresponding to the steering wheel angle, and outputting a result of the combination as a ranging result.

13. A non-transitory computer readable medium storing a program executable by a processor to perform processing comprising:

recognizing an object included in a captured image captured by a camera mounted on a vehicle;

estimating a first distance between the vehicle and the recognized object based on the captured image by using a first distance estimation method in which the first distance is estimated by estimating a depth of each part in the captured image by using a result learned by using deep learning;

estimating a second distance between the vehicle and the recognized object based on the captured image by using a second distance estimation method in which the second distance is estimated based on motion parallax in a plurality of the captured images; and combining the first distance and the second distance by weighting and adding the first distance and the second distance with a weight corresponding to the steering wheel angle, and outputting a result of the combination as a ranging result.

* * * * *